Dec. 14, 1926. 1,610,706

C. L. RAGOT ET AL

LOGARITHMIC SCALE

Filed July 9, 1923

INVENTORS
Charles L Ragot
Adrien Lacroix
BY
Dean Fairbank Obright & Hirsch
ATTORNEYS Patented Dec. 14, 1926.

1,610,706

UNITED STATES PATENT OFFICE.

CHARLES L. RAGOT, OF LONG ISLAND CITY, AND ADRIEN LACROIX, OF NEW YORK, N. Y.

LOGARITHMIC SCALE.

Application filed July 9, 1923. Serial No. 650,228.

The ordinary five place logarithmic tables of eighteen pages give the logarithm to five places for each four place number from 1,000 to 9,999. To find the logarithm for any five place number, it is necessary to interpolate, that is, to add to the logarithm of the four place number corresponding to the first four digits of the five place number, the proper proportionate part of the difference between it and the logarithm of the next successive four place number. This includes subtraction to obtain the difference, multiplication to obtain the amount to be added, and addition.

In using such a table there are many sources of error. There may be a typographical error in the printing of the table, and it might be impossible to detect this from an inspection of the table, particularly if the error be in the last digit of the logarithm. The user may fail to accurately trace the row of figures across the page, particularly if the fourth digit of the number whose logarithm is required be a 7, 8 or 9. The user may thus take the logarithm printed above or below the one which he should take. He may misread the logarithm, for instance reading a 3 for an 8, particularly if the print or the light be poor.

One of the most prolific sources of error is in interpolation. To find the anti-logarithm, that is, the number corresponding to a given logarithm, is difficult, as the logarithm one is looking for, even if of but four figures is generally not in the table, and one must do a more difficult form of interpolation to find the anti-logarithm.

To avoid the necessity for such interpolation one may use tables giving the numbers to five places, but such tables cover ten times as many pages on the tables giving the numbers to four places, and are therefore very much more costly and more bulky to handle. Furthermore, they require a longer time in turning the pages to locate the number desired.

One of the main objects of our invention is to provide, in compact and clearly readable form, means for the direct reading of numbers to five places without the need for interpolation, and in which sources of error in printing will be readily apparent to the most casual glance, and error in locating or reading is reduced to the lowest possible minimum.

In carrying out our invention there is provided a scale graduated to represent all of the numbers from 10,000 to 100,000, that is, for all of the numbers of five places, and juxtaposed to this scale is a second one subdivided into spaces representing the entire range from the logarithm of 10,000 to the logarithm of 100,000, constituting a complete logarithmic cycle. The numbers are therefore in direct sequence in both scales, but the spacing is such that the logarithm of any number in one scale is directly opposite to said number and on the other scale. Logarithms of all numbers of five places may be directly read without interpolation, and as every logarithm is present up to five places, it is just as easy to find the number corresponding to any logarithm as it is to find the logarithm corresponding to any number. As all of the figures in the number scale, as well as in the logarithmic scale, run in direct sequence without omissions, the finding of logarithms or numbers is very easy, and there is little or no danger of mistake.

Our improved scale might be in the form of a single strip or tape which might be mounted on a pair of parallel spools and wound from one to another to bring any part into view, or it might be printed in helical form on the surface of a drum. Preferably it is subdivided into sections arranged parallel and in succession on successive sheets, with several sections per sheet.

As the difference between logarithms for successive numbers decreases as the numbers increase, a further object of the invention is to so form the scale that the numbers and logarithms may be read with equal facility at all parts of the scale. To accomplish this object the sections at different points along the scale are made with the numerical graduations at different distances apart. For instance, the first section of the scale may have only thirty numbers, whereas the last section of the scale may have one hundred and twenty-five numbers, although the sections are of equal length. This first section will have one hundred and thirty logarithmic graduations, as the logarithm of 10030 is 00130. (disregarding the decimal points). The last section will have only about fifty-four subdivisions in the logarithmic scale, as the logarithm of 99,875 (100,000 minus 125) is 99,946, (100,000 minus 54). Intermediate sections of the same length may have forty, fifty, sixty, eighty, or one hundred numbers, as the difference between the logarithms of successive numbers decreases. The selection of the proper spacing of numbers per section is such that at no point in the scale are the subdivisions so close together as to prevent either scale from being easily read.

As another important feature of our invention, all of the scale sections are arranged at right angles to a pair of columns, one containing the two leading digits of the numbers, and the other containing the two leading digits of the logarithms. The successive numbers constituting these leading digits are spaced along the column so as to come opposite to each thousand subdivisions on the scale sections. In other words, 10 as the two leading digits of 10,000, would appear opposite the beginning of the first scale section, and would not be repeated except possibly at the beginning of a new page. 11 as the two leading digits of 11,000 would appear opposite the beginning of the scale section which has the thousandth subdivision from the beginning. 00 would occur in the column for logarithms and opposite to the beginning of the first section, and would not be repeated except possibly at the top of a new page, while 01 would appear in the logarithm column at the beginning of the section having the thousandth subdivision in the logarithmic scale. The third and fourth digits of both the numbers and logarithms are printed in succession along the successive scale sections and at the proper spacing, while the fifth digit of the number and of the logarithm is not printed but is indicated by the ten subdivisions along the scale sections between successive pairs of digits on the latter.

To find any number it is merely necessary to go down the number column to reach the first two digits, then across the successive scale sections to reach the next two digits of the number, and then count subdivisions along the scale equal to the last digit of the number. This point is carefully noted. The logarithm corresponding to the number may be read directly. Its first two digits will be in the logarithm column before the particular scale section containing the located point, its next two digits will be on the scale section on the logarithm side in advance of the point located, and its fifth digit will be the number of the logarithm scale divisions between the last mentioned pair of digits and the graduation nearest to the located point.

It will be obvious that finding anti-logarithms involves exactly the same process and is exactly as easy, and neither process involves any interpolation. As the first two digits of the number, that is, 10 to 99, are printed in succession down the number column, and the first two digits of the logarithm, that is 00 to 99 are printed in succession down the logarithm column, and as the numbers 00 to 99 occur in succession along the scale sections between each two consecutive numbers in the number column and also between each two consecutive numbers in the logarithm column, it will be apparent that proof reading to detect any typographical error in the printing is very simple. Adjacent numbers must be consecutive numbers in both columns and along the scale, and error is very easily detected. This also equally facilitates the reading of numbers, and the user is not liable to mistake one number for another. For instance, if a 97 be poorly printed so as to look like a 91, he will readily notice that it should be a 97, as it occurs between 96 and 98. This is not the case where there is a big jump in numbers, as in the logarithms printed in the ordinary table.

In the accompanying drawing we have illustrated certain of the scale sections which may be employed in making up a complete scale. In these drawings.

It will be noted that each section includes a line A of convenient length to be printed on an ordinary page, and this line intersects two vertical columns B and C which are headed "Nos." for numbers, and "Logs." for logarithms. At the upper side of each line A are a series of subdivisions uniformly spaced for each section but the spacing need not be the same for different sections. Each tenth subdivision is numbered, and each pair of digits along these subdivisions ending with 0 or 5 may be underlined to facilitate rapid location of any particular number. Below each line A are a series of subdivisions non-uniformly spaced, the spacing being according to the logarithmic progression, and completing one logarithmic cycle.

Figure 1:
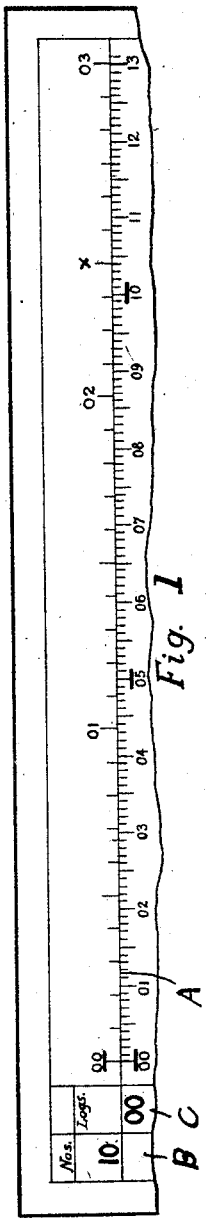
Fig. 1 represents the first section of the scale.
Figure 3:
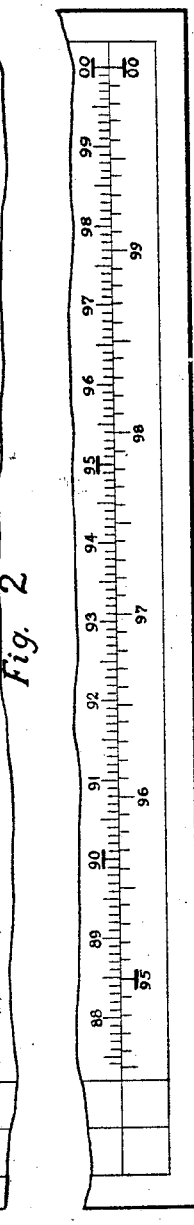
Fig. 3 is the last section.

From Fig. 1 it will be seen that there are one hundred and thirty subdivisions on the logarithmic part of the scale for thirty subdivisions in the number part of the scale, whereas in Fig. 3 it will be seen that there are fifty-four subdivisions of the logarithmic scale for one hundred and twenty-five subdivisions of the number scale. In neither section is there more than one hundred and thirty subdivisions in either scale. Of course if the scale be printed on a larger page there may be a smaller number of sections, and each section may have a larger number of subdivisions for both scales.

It will be apparent that the change between successive thousandths will frequently occur in the logarithmic scale intermediate of the ends of a section, and any suitable means may be employed for indicating this fact and instructing the user to take the next lower number in the logarithmic column rather than the preceding number in said column, to obtain the first two digits of the logarithm. The same applies to the number scale, although the scale sections may be made of such length that this change does not occur so often. As a convenient manner of indicating this change we employ a second line D parallel to the line A and between it and the numerals of the scale, and extending from the 00 to the end of the scale section, wherever such 00 occurs intermediate of the ends of either the number scale or the logarithmic scale.

The following are a few examples of the use of our improved device.

If the logarithm of 10,024 is desired, the user locates the first two numerals, namely 10 in the number column, then goes across the scale to the numerals 02 in the first scale section, which are the third and fourth digits of the number, and then counts to the fourth subdivision on the scale after 02. This located point is marked "x" in Fig. 1 of the drawing. The logarithm of this number will be 00104. Of the logarithm, the first two digits are in the column C, the next two are the numeral below the line A and in advance of the located point "x" and the last digit is the fourth subdivision beyond the numeral 10.

Figure 2:
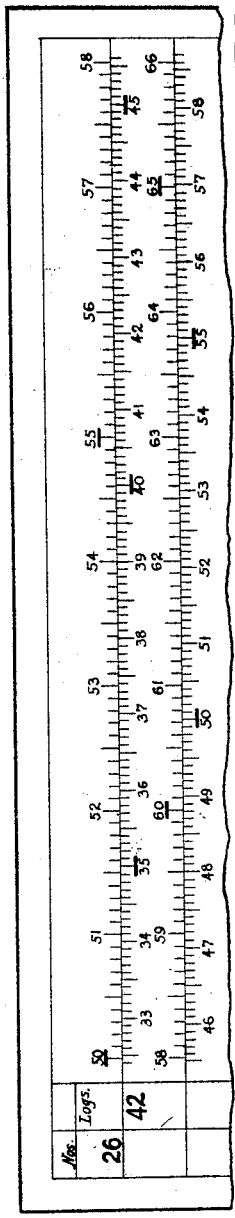
Fig. 2 is a group of intermediate sections.

The finding of a number corresponding to any logarithm is equally simple. For instance, the number corresponding to the logarithm 43025 is found by locating the point which is marked "y" in Fig. 2. Because the 00 occurs in the logarithm scale in the same line with 025, the numeral for the first two digits is opposite the line below. The number corresponding to this logarithm will be 26931.

The scale is very much more accurate than the ordinary five place logarithmic tables.

In such tables the last digit is an approximation. For instance, the logarithm for 9990 is given in the table as 99957. From the scale (Fig. 3) it will be noted that the logarithm of 99901 is 99957 and the logarithm of 99899 is 99956. The scale therefore shows that the logarithm of 9990 is actually 999565. In Fig. 3 the numerals 99 are not shown in either the column B or the column C as this figure shows only the very last line of the scale, and the numerals 99 in the two columns would be farther up on the page bearing this last line.

The specific construction disclosed in the accompanying drawings embodies Briggs' logarithms of the natural numbers on the base 10. It will of course be evident that the invention is also applicable to logarithms with other bases than 10, the logarithms of the trigonometric functions such as log sin, log cos, log tan, log cot, etc. It may also be used for giving the natural functions of the angles, such as sines, cosines, tangents, cotangents, secants and cosecants. It may also be used for the direct reading of values, particularly where the progression of values is other than a uniform one, as for instance in determining the circumference, area, spherical volume, capacity in gallons, liters, or the like, for each successive change in diameter or other function.

It will be readily seen that our invention makes possible the embodiment of otherwise elaborate, voluminous and cumbersome tables into a small compass of convenient and compact form which is at the same time readable from either scale to the other with reliability and accuracy.

In the drawings, the scales given are for numerals of five places and the logarithms may be directly read to five places, and in some cases closely approximated to the sixth place. It will of course be evident that the same character of table may be used for six place tables in which case the first three numerals would appear in the number column and in the logarithm column, instead of only the first two, as shown in the drawing.

In all of the examples hereinbefore given, and in the description the question of decimal point has not been taken into consideration, as the same rules for placing the decimal and for determining the characteristic before the decimal point which apply in the use of logarithmic tables will apply in the use of our scale.

Having thus described our invention, what we claim as new and desire to secure by Letters Patent is:

1. A chart comprising a group of horizontally disposed parallel lines arranged adjoining to a pair of vertically disposed marginal columns at the left hand margin, said lines having a continuity of graduations beginning at the margin of the first line and ending at the end of the last line, the graduations being arranged in two series and extending in opposed relation to each other along the said lines, one of said series of graduations being spaced in arithmetical progression and bearing suitable numerical indicia readable partly in one of said marginal columns and partly along said graduations, the other of said series of graduations being spaced in logarithmic progression and having similar indicia readable partly in the other of said marginal columns and partly along the second said graduations, and indicia disposed at the top of the said marginal columns to denominate the values of the indicia thereunder.

2. A chart comprising a group of parallel lines arranged adjoining to a pair of marginal columns, said lines having a continuity of graduations beginning at the margin of the first line and ending at the end of the last line, the graduations being arranged in two series and extending in opposed relation to each other along the said lines, one of said series of graduations being spaced in one order of progression, and bearing suitable numerical indicia readable partly in one of said marginal columns and partly along said graduations, the other of said series of graduations being spaced in another order of progression and having similar indicia readable partly in the other of said marginal columns and partly along the second said graduations, and indicia disposed at the top of the said marginal columns to denominate the values of the indicia thereunder.

3. A chart comprising a continuity of two adjoining scales plotted with graduations on opposite sides of a horizontal line, each being readable in terms of the other, said line being sectionized in convenient lengths, said sections being grouped in consecutive order along a margin having two columns intersecting said line, the graduations of one scale being plotted in equal increments, and the graduations of the other scale being plotted in varying increments, indicia consisting of digits, indicating numerical values or quantities and subdivisions thereof, same being readable partly in one of said marginal columns and partly along the equally spaced graduations, similar digits indicating other values, being readable partly in the other of said marginal columns and partly along the graduations of varying increments, and indicia disposed at the top of said marginal columns to denominate the digits thereunder.

4. A chart comprising a scale, in which two adjacent series of graduations bearing a fixed relation to each other are sectionized in convenient lengths arranged to begin at a common margin, separate numerical indicia indicating the values of each of said series of graduations, two columns in said margin bearing part of the digits of each of said numerical indicia, the remainder of each of said numerical indicia being readable along each of the said series of graduations, the graduations of one of said series being spaced to represent numerical values or quantities, the graduations of the other of said series being spaced to represent the logarithms corresponding to the numerical values or quantities represented by the graduations of the other series, the values indicated in each series being readable in terms of the other.

5. A chart having a pair of vertical columns adjacent to the left hand margin, and a group of horizontal lines extending to the right from said columns, said lines having a continuity of graduations beginning at the left hand end of the first line, and ending at the right hand end of the last line, the graduations being arranged in two series upon opposite sides of each line, one of said series of graduations being spaced in arithmetical progression and bearing numerical indicia, the first two digits of which are disposed in one of said marginal columns and the third and fourth digits of which are at spaced points along said lines, the other of said series of graduations being spaced in logarithmic progression and having similar indicia, the first two digits of which are in the other of said marginal columns and the second and third digits being at spaced points along the second of said graduations.

Signed at New York, in the county of New York and State of New York, this 2nd day of July, 1923.

CHARLES L. RAGOT.
ADRIEN LACROIX.